Figures 1, 2:
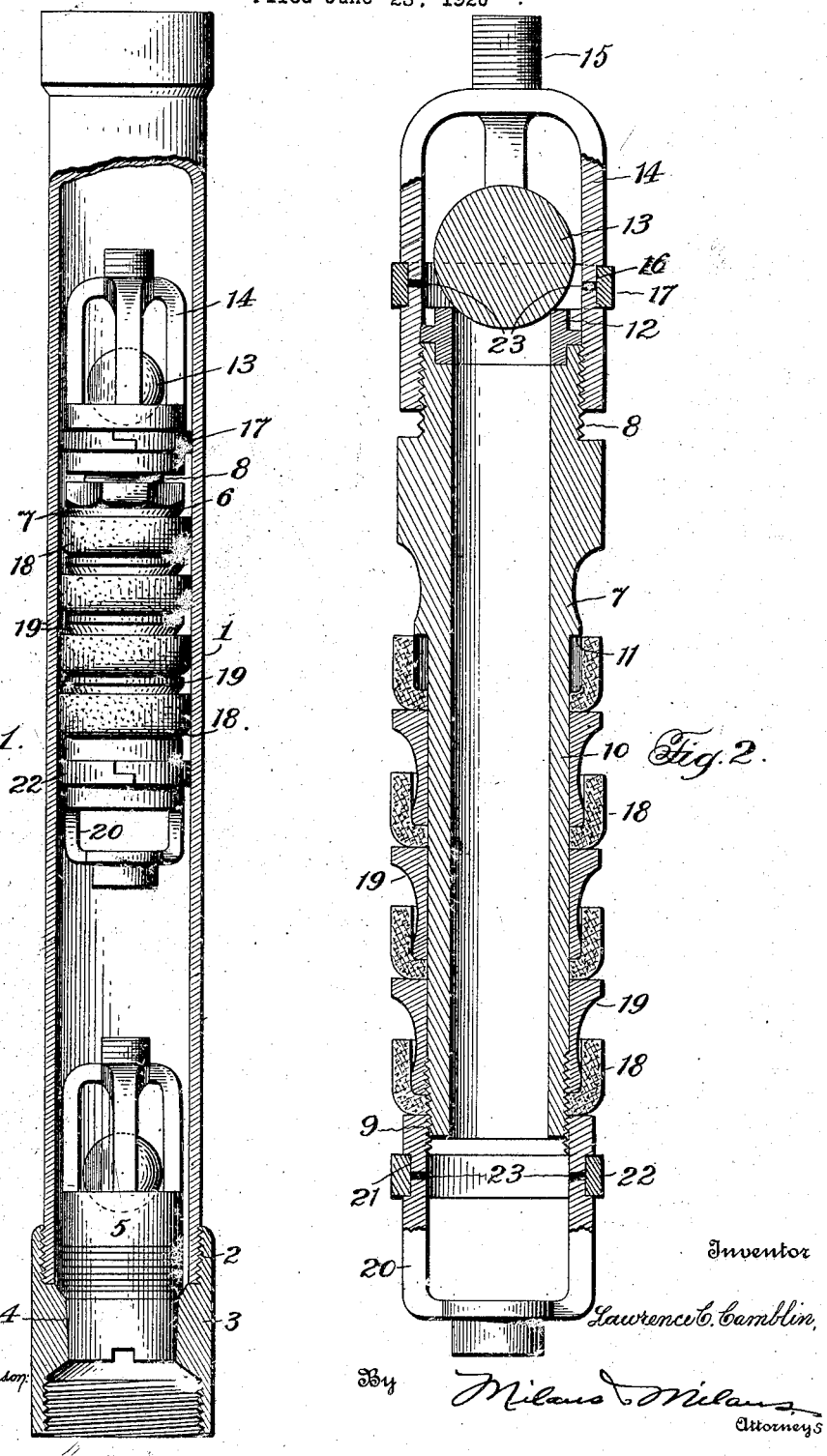

June 10, 1924.

L. C. CAMBLIN

PUMP PLUNGER

Filed June 23, 1920

1,497,541

Witness:
Jas. L. Hutchinson

Inventor
Lawrence C. Camblin,
By Milans & Milans
Attorneys

Patented June 10, 1924.

1,497,541

UNITED STATES PATENT OFFICE.

LAURENCE C. CAMBLIN, OF TULSA, OKLAHOMA.

PUMP PLUNGER.

Application filed June 23, 1920. Serial No. 391,078.

*To all whom it may concern:*

Be it known that I, LAURENCE C. CAMBLIN, a citizen of the United States, residing at Tulsa, in the county of Tulsa and State of Oklahoma, have invented certain new and useful Improvements in Pump Plungers, of which the following is a specification, reference being had therein to the accompanying drawing.

My invention relates to new and useful improvements in a pump plunger and more particularly to such a device for use in oil wells.

The principal object of my invention resides in the provision of packing rings so arranged on the plunger that a tight fit will always be secured with the pump or plunger barrel.

Another object consists in the arrangement of an expansible packing ring on each side of the packing cups to prevent undue wear of said packing cups.

Still another object resides in the provision of grooves around the plunger body for receiving the expansible packing rings and openings leading from said grooves, under the packing rings, to the interior of the plunger body.

With these and other objects in view my invention consists in the novel details of construction and arrangement of parts as will be more clearly understood from the following specification and drawings, in which:—

Figure 1 is a vertical section through the pump barrel showing the pump plunger in side elevation, and Figure 2 is a vertical section through the pump plunger with parts shown in elevation.

In the drawings, 1 indicates the pump or plunger barrel which is exteriorly threaded at the lower end, as shown at 2 for receiving the interiorly threaded bushing 3. This bushing is provided with an inwardly extending flange 4, adapted to receive and support a standing valve 5 of usual construction.

The pump plunger is indicated generally at 6 and is adapted to reciprocate in the barrel 1 over the standing valve 5. This plunger comprises a hollow cylindrical body 7 having exterior threads 8 at the upper end and exterior threads 9 at the lower end. The lower end of the body is reduced as shown at 10 and forms a shoulder 11 for a purpose to be later described.

A recess is formed in the upper end of the body 7 to receive a removable valve seat 12 and a ball valve 13 is adapted to normally rest upon the valve seat, and an interiorly threaded cage 14 is received on the upper end of the body and engages the threads 8. This cage is provided, on the top, with a threaded shank 15 for receiving the plunger rod. A circumferential groove 16 is formed in the outer face of the cage and receives an expansible metallic packing ring 17.

A plurality of packing cups 18, of leather, rubber, or other flexible material, are received around the reduced portion 10 of the body, between the lower end and the shoulder 11, and are held in spaced relation by means of the spacing rings 19. The shoulder 11 will limit the upward movement of the uppermost packing cup. An interiorly threaded cage 20 is received on the lower end of the body and engages the threads 9. This cage 20 is provided with a circumferential groove 21 in its outer face and an expansible metallic packing ring 22 is received in this groove. The cage 20 will hold the packing cups 18 and spacing rings 19 on the reduced portion, and, as above stated, the shoulder 11 will limit the upward movement of the cups.

A plurality of circumferentially spaced openings 23 extend from the grooves 16 and 21, under the packing rings 17 and 22, to the interior of the body. These openings 23 will allow sediment, which may get under the packing rings, to pass out through the hollow body.

From the above detailed description, it is thought that the construction of my device will be clearly understood. The expansible metallic packing rings 17 and 22, on each side of the packing cups 18, prevent undue wear of said packing cups and at the same time make a tight fit between the reciprocating plunger and the barrel. I am well aware that it is old to have a plunger provided with packing cups, but such cups are exposed to the fluid and sand and other sediment which wears the cups. I, therefore, provide a packing ring on each side of the packing cups to prevent sand and other ingredients from passing to the cups to wear the same. At the same time these packing rings form a tight fit between the plunger and the barrel and prevent the forming of scale, gypsum and like elements inside of the barrel. The expansible packing rings will preferably be of material softer than that of which the barrel is constructed to eliminate wearing the barrel larger. It is possible that sand or other sediment might work under the expansible packing rings and it is for this purpose that I provide the openings 23 leading from the grooves to the interior of the body. It will be understood that the plunger will be reciprocated in the usual manner and that the oil or other fluid will be drawn through the standing valve 5 and raised by the plunger. When the packing cups are exposed to wear, particles of the leather, rubber, etc., of which the cups are made, drop therefrom and interfere with the proper operation of the plunger and various valves.

While I have described the preferred embodiment of my invention, it will be understood that such changes may be made as will fall within the scope of the appended claim.

Having fully described my invention, what I claim as new and desire to secure by Letters Patent is:—

A pump plunger comprising a hollow body, a valve normally seated on the upper end of the body, flexible packing cups received on the body intermediate its ends, a cage detachably connected to each end of the body and having a circumferentially extending groove, the upper cage confining the valve and limiting the movement thereof and the lower cage retaining the flexible packing cups upon the body, and an expansible packing ring received in the groove of each cage, said packing rings being carried by and removable with the cages.

In testimony whereof I hereunto affix my signature in the persence of two witnesses.

LAURENCE C. CAMBLIN.

Witnesses:
 Amos V. Todd,
 H. R. Funk.